(12) United States Patent
Hon et al.

(10) Patent No.: US 7,684,955 B2
(45) Date of Patent: Mar. 23, 2010

(54) NONCONTINUOUS RESONANT POSITION FEEDBACK SYSTEM

(75) Inventors: Robert C. Hon, Playa del Rey, CA (US); Thomas H. Pollack, Santa Monica, CA (US); Michael H. Kieffer, Redondo Beach, CA (US); Carl S. Kirkconnell, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 255 days.

(21) Appl. No.: 11/803,741

(22) Filed: May 16, 2007

(65) Prior Publication Data

US 2008/0288206 A1     Nov. 20, 2008

(51) Int. Cl.
   *G06F 19/00* (2006.01)
(52) U.S. Cl. .................................... 702/150
(58) Field of Classification Search ............... 702/150, 702/158, 159; 356/3, 4.01
   See application file for complete search history.

(56) References Cited

U.S. PATENT DOCUMENTS

| | | | | |
|---|---|---|---|---|
| 5,894,220 | A * | 4/1999 | Wellstood et al. ............ | 324/248 |
| 6,094,912 | A * | 8/2000 | Williford ..................... | 60/520 |
| 6,151,111 | A * | 11/2000 | Wechsler et al. ............ | 356/318 |
| 6,167,707 | B1 | 1/2001 | Price et al. | |
| 6,361,168 | B1 * | 3/2002 | Fujieda ....................... | 351/208 |
| 6,539,327 | B1 * | 3/2003 | Dassot et al. ................ | 702/150 |
| 6,727,988 | B2 * | 4/2004 | Kim et al. .................... | 356/319 |
| 6,820,017 | B1 * | 11/2004 | Jurisch et al. ................ | 702/60 |
| 6,912,862 | B2 | 7/2005 | Sapir | |
| 2004/0007004 | A1 * | 1/2004 | Sapir .......................... | 62/228.1 |
| 2005/0161592 | A1 * | 7/2005 | Watanabe et al. ........... | 250/234 |
| 2006/0119350 | A1 * | 6/2006 | Berchowitz et al. ......... | 324/207.2 |
| 2006/0181530 | A1 * | 8/2006 | Slavin ......................... | 345/440 |
| 2006/0237664 | A1 * | 10/2006 | Kane ........................... | 250/458.1 |
| 2008/0002194 | A1 * | 1/2008 | Matsui ......................... | 356/237.3 |

FOREIGN PATENT DOCUMENTS

| | | |
|---|---|---|
| DE | 199 34 055 A1 | 2/2001 |
| DE | 10 2005 041010 A1 | 6/2006 |

OTHER PUBLICATIONS

Sivadasan, "A Novel Magnetic Suspension Cum Linear Actuator System for Satellite Cryo Coolers", IEEE, vol. 30, Issue 3, pp. 1258-1262.*

* cited by examiner

*Primary Examiner*—Michael P. Nghiem
*Assistant Examiner*—Cindy H Khuu
(74) *Attorney, Agent, or Firm*—Pillsbury Winthrop Shaw Pittman, LLP

(57) ABSTRACT

A system and method for sensing position of an oscillating moving element. The inventive position sensor includes a first arrangement for sampling the position of the element at first positions thereof and providing samples in response thereto and a second arrangement for calculating other positions of the element using the sample of the first position. In the illustrative application, the first arrangement includes an LED and a photodiode and the moving element is a piston of a long-life cryogenic cooler. A processor receives samples from the photodiode and solves an equation of motion therefor. The equation of motion is $P(t)=A \cdot \sin(\omega t+\theta)+B$, where $P(t)$=the position of the element; $A$=position waveform amplitude; $B$=position waveform DC Offset; $\omega$=angular frequency of operation; $t$=time; and $\theta$=position waveform phase.

11 Claims, 8 Drawing Sheets

NONCONTINUOUS RESONANT POSITION FEEDBACK SYSTEM

BACKGROUND OF THE INVENTION

1. Field of the Invention

The present invention relates to long-life cryogenic coolers. More specifically, the present invention relates to position sensors used in linear-oscillating, closed-cycle cryogenic coolers.

2. Description of the Related Art

For certain applications such as space infrared sensor systems, a cryogenic cooling subsystem is required to achieve improved sensor performance. Numerous types of cryogenic cooling subsystems currently exist, each having relatively strong and weak attributes relative to the other types. Some space cryocoolers, for example, offer efficiency, operational flexibility and vibration performance at the expense of increased mass and volume relative to other available systems.

Long-life linear-oscillating cryogenic coolers are often designed for lifetimes of well over 10 years under continuous operation. These cryocoolers are not only expected to reliably provide effective cooling for many consecutive years, but are expected to very precisely control the temperature of their cold sinks by actively and precisely varying the stroke characteristics of their internal operating elements. These long-life cryocooler systems therefore include active reciprocating-element position feedback. The stroke amplitude and offset of the various reciprocating elements must be monitored and controlled so that the moving elements do not overstroke and therefore physically impact other parts of the cooler during operation. Such an overstroke or impact can mechanically damage the moving elements and their flexure suspension system, as well as create large amounts of vibration and shock forces that many systems (to which the cryocoolers are attached) are simply unable to tolerate.

The long-life nature of these designs requires that these position measurements be zero-contact so that no friction exists and no contaminants are generated. The sensors used to take these measurements are often a significant portion of the total cryocooler system size, require significant amounts of support electronics, and are usually very expensive.

A variety of sensors have been used in the past to make zero-contact measurements of oscillating element stroke amplitude and phase. Most notably, Linear-Variable Differential Transformer (LVDTs) sensors, capacitive sensors, and eddy-current sensors have been used. Generally the sensors provide accurate, continuous position feedback with zero contact. The continuous-feedback nature of these devices implies significant mechanical and electronic complexity; LVDT sensors are very large, expensive, and require significant drive and demodulation circuitry. While capacitive and eddy-current sensors are somewhat smaller, they require specialized demodulation circuitry and are also expensive in small quantities.

The inclusion of position feedback sensors in the various cryocooler mechanisms has the effect of increasing the total cryocooler package size and mass.

Hence, a need remains in the art for a system or method for sensing the position of moving components of long life cryogenic coolers.

SUMMARY OF THE INVENTION

The need in the art is addressed by the system and method for sensing position of a moving element in a linear-oscillating cryocooler. The inventive position sensor includes a first arrangement for sampling the position of the element at several positions thereof and providing a sample in response thereto and a second arrangement for calculating other positions of the element using the sample of the first position.

In the illustrative application, the first arrangement includes an LED (light-emitting diode) and a photodiode and the moving element is a piston of a long-life cryogenic cooler. A processor receives samples from the photodiode and solves an equation of motion therefor. In the illustrative embodiment, the equation of motion is $P(t)=A \cdot \sin(\omega t+\theta)+B$, where $P(t)$=the position of the element; $A$=position waveform amplitude; $B$=position waveform DC Offset; $\omega$=angular frequency of operation; $t$=time; and $\theta$=position waveform phase.

The invention is not limited to use of an optical sensing arrangement. Capacitive, inductive or other sensing technologies may be used. In addition, the invention is not limited to an arrangement by which light is blocked by the moving element. That is, other schemes may be used by which movement of the element either causes or terminates a reflection or transmission from a source to a sensor.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
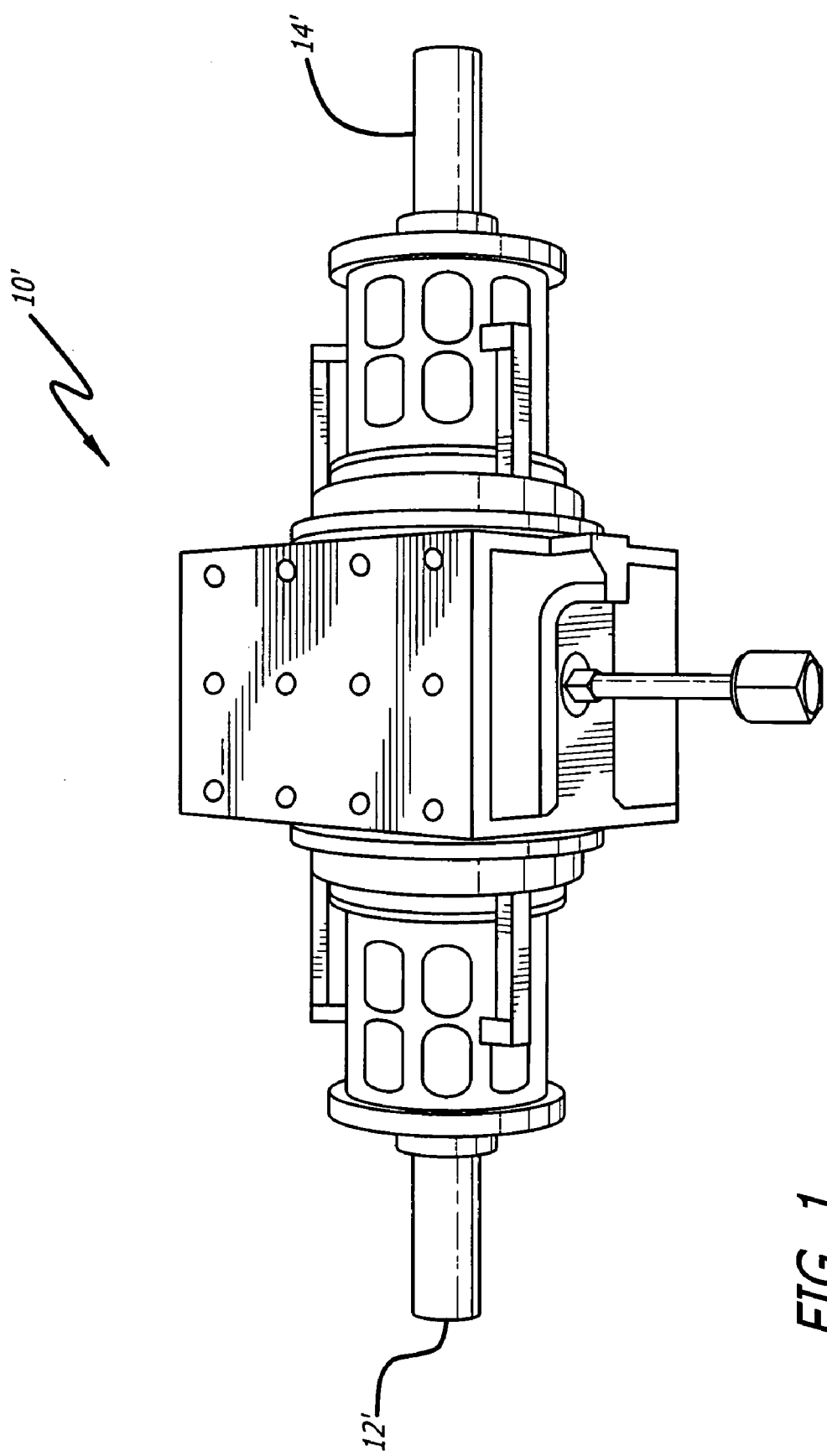
FIG. 1 is a diagram of a conventional long-life cryocooler compressor module that uses LVDT sensors for position feedback.

FIG. 1 is a diagram of a conventional long-life cryocooler compressor module 10' that uses LVDT sensors for position feedback. End covers (not shown) are removed in FIG. 1 to reveal two LVDTs 12' and 14'. The LVDTs are used to sense the position of first and second internal moving pistons (not shown). As illustrated in FIG. 1, the LVDTs typically occupy approximately 25% of the total length of the module 10'. The LVDT system is therefore responsible for a significant percentage of the module's total length, volume and mass.

Additionally, the LVDT sensors require a significant amount of drive and demodulation circuitry in order to function properly. This adds a large number of parts to the cryocooler drive electronics, increasing cost, complexity, and size while reducing overall electronics reliability. Other continuous-feedback position sensor systems have strengths and weaknesses relative to the LVDT system, however they nonetheless generally have significant drawbacks at the cryocooler system level.

Those skilled in the art appreciate that an ideal position feedback system would not add any significant mass, volume, complexity, or reliability issues to the cryocooler system. Inevitably, the addition of a continuous-feedback sensor system adds one or more of the above negative features to the system.

The present teachings are based, at least in part, on a recognition that although continuous position feedback seems desirable, it is not in fact necessary. This is due to the fact that inasmuch as linear-oscillating cryocoolers are highly resonant systems, regardless of the waveform shape that is used to drive the cryocooler motors, the moving elements will move in a very sinusoidal fashion. The mechanisms involved are essentially spring/mass resonators, which resist moving at frequencies much higher than their fundamental resonant frequency. Because distortion in the position waveform is simply higher-order harmonic content, the fundamental nature of the resonant mechanism prevents distortion of the position waveforms. Hence, a plot of position versus time for well-designed cryocooler moving elements will look very sinusoidal regardless of the drive waveform. This is depicted as waveform 11 in FIG. 2.

Figure 2:
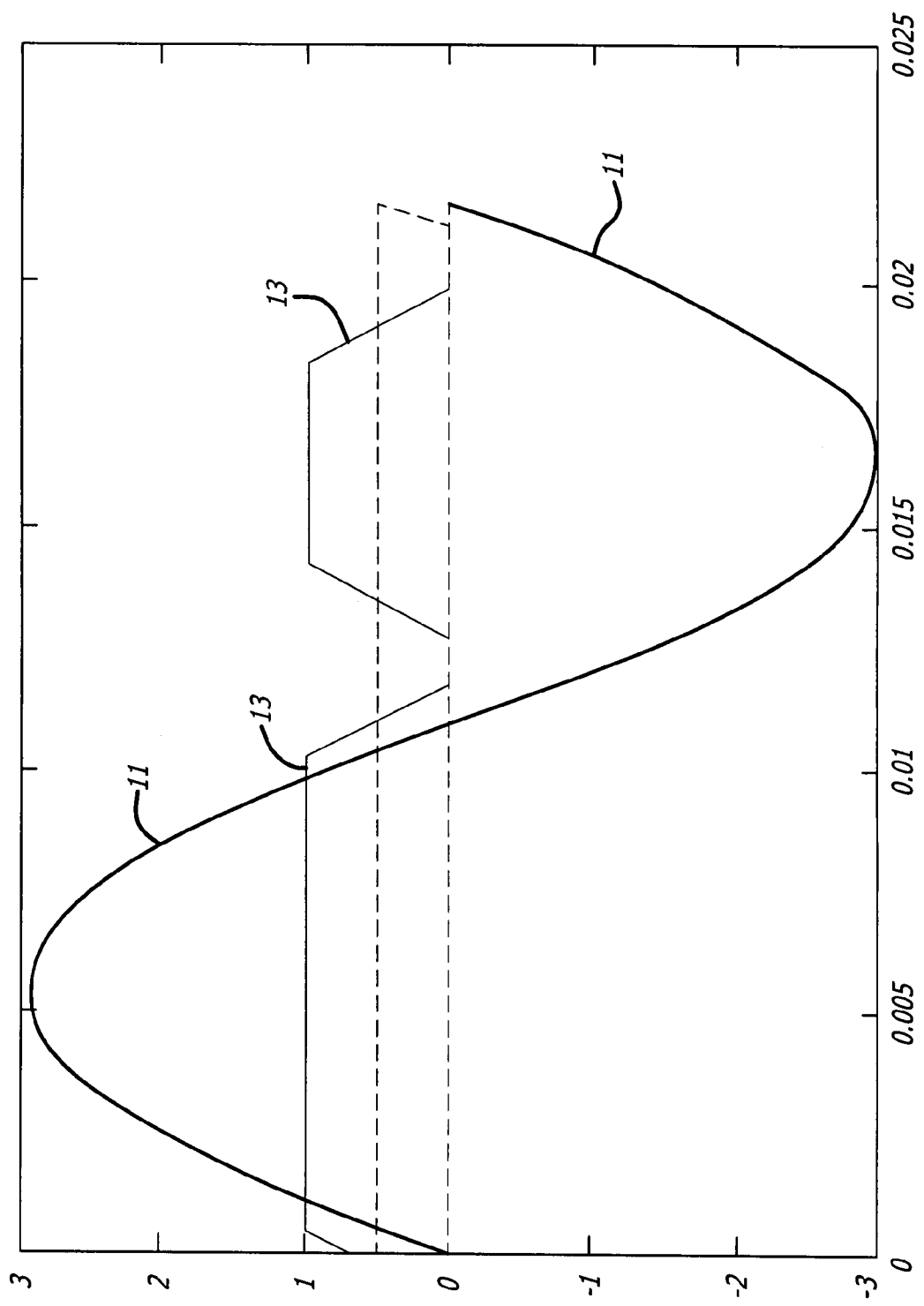
FIG. 2 is a diagram showing a typical position waveform and sample sensor output versus time in accordance with the present teachings.

FIG. 2 is a diagram showing a typical moving element position waveform and sample sensor output versus time in accordance with the present teachings.

In accordance with the present teachings, knowledge that the piston position waveforms are sinusoidal is utilized. Specifically, an equation to describe these waveforms to a high degree of accuracy is employed. This equation is:

$$P(t)=A\cdot\sin(\omega t+\theta)+B \quad [1]$$

where:
P(t)=position of the element;
A=position waveform amplitude (unknown);
B=position waveform DC Offset (unknown);
ω=angular frequency of operation (known);
t=time (known); and
θ=position waveform phase (unknown).

In the above equation, "time" is simply a reference to a system clock within the electronics. "Frequency" is determined by the motor drive waveform that is known precisely. The equation for moving-element position therefore contains two known and three unknown quantities.

In accordance with the present teachings, three discrete samples of the waveform in question are used to solve the equation [1] for the three unknown quantities. At this point, all relevant information about the position waveform will be known. Hence, a set of three discrete samples of the moving-element position waveform is adequate to fully describe the position waveform in a mathematical sense. Continuous position feedback is therefore not required, meaning that continuous-feedback sensors need not be employed.

As a side note, the possibility exists that additional samples above and beyond the minimum 3 may add reliability and/or accuracy. The central point remains that a relatively small number of discrete samples can be used to accurately calculate the overall characteristics of a sinusoidal waveform.

Figure 3:
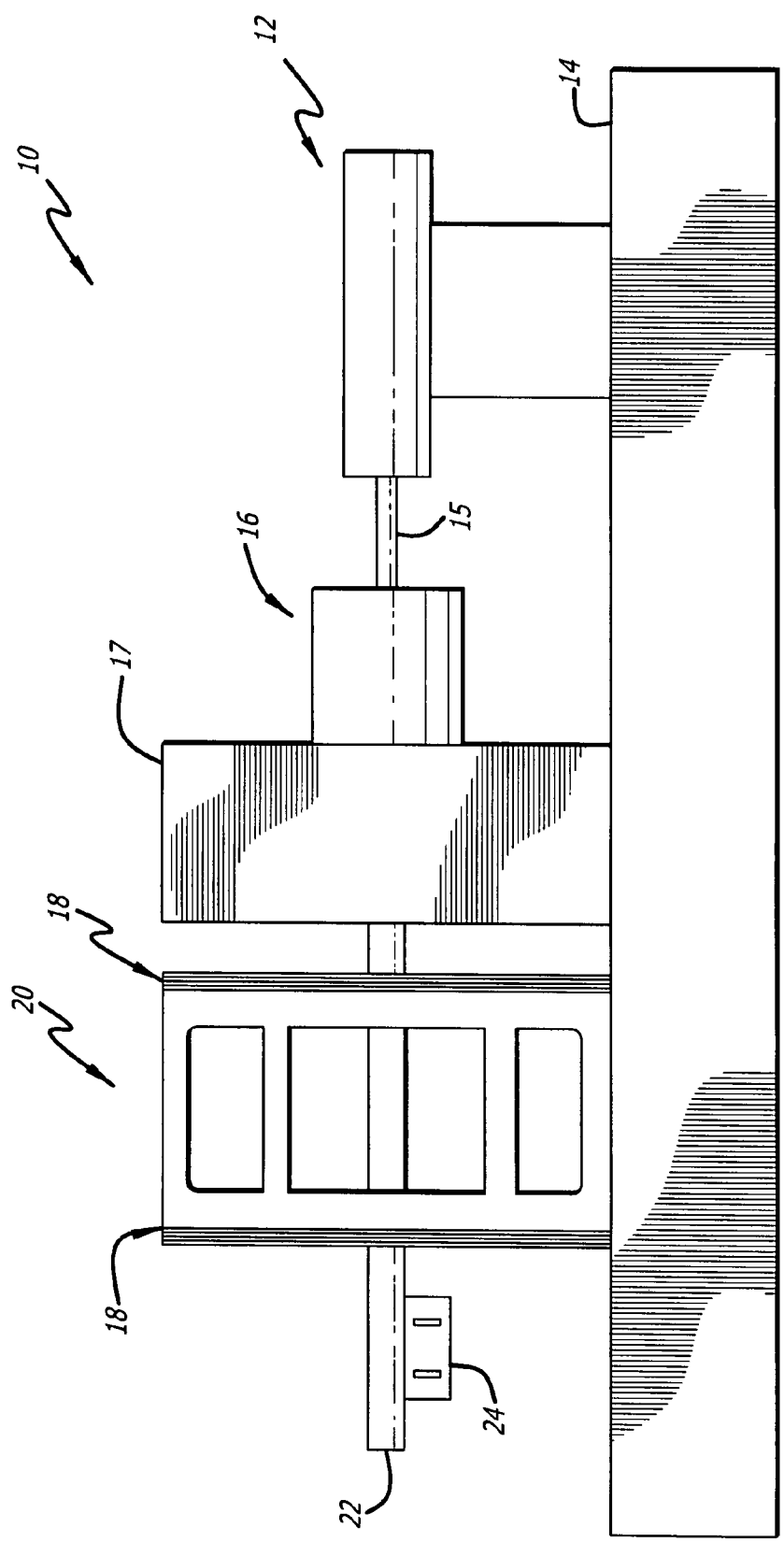
FIG. 3 is a diagram of cryocooler position feedback system implemented in accordance with the present teachings.

FIG. 3 is a diagram of cryocooler position feedback system implemented in accordance with the present teachings. The system 10 includes an LVDT 12 mounted on a base 14. The LVDT 12 is driven by a motor 16 through a piston 15. A motor mount 17 is adjacent to the motor and serves to mechanically support it. Flexure stacks 18 are disposed about a suspension cage 20. Together, the flexure stacks and suspension cage support the moving piston throughout its motion and provide an appropriate spring force in order to achieve a particular resonance frequency (improving efficiency in a cryocooler application). A shaft 22 is coupled to the piston 15 and reciprocates therewith from left to right in the figure as shown by the line with double arrowheads.

As discussed more fully below, in accordance with the present teachings, the blade 24 interrupts a beam from a light emitting diode (LED) 26 to a photodiode 28 (both not shown in FIG. 4). This is depicted in FIG. 4 below.

Figure 3A:
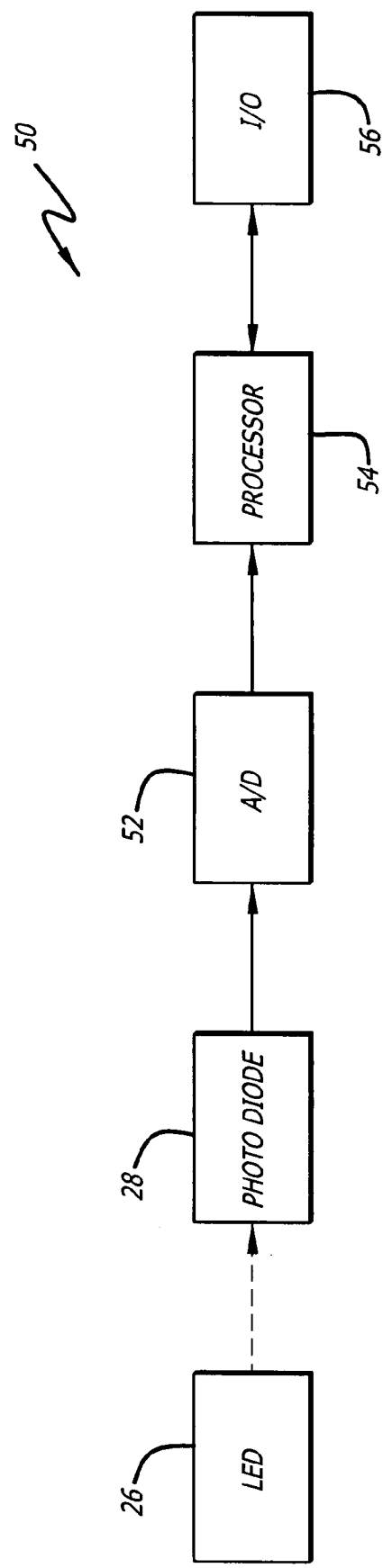
FIG. 3a is a block diagram of an illustrative implementation of an electrical circuit for use with the inventive position sensing system.

FIG. 3a is a block diagram of an illustrative implementation of an electrical circuit for use with the inventive position sensing system. As shown in FIG. 3a, light from the LED is detected by the photodiode 28. The photodiode 28 outputs an analog signal to an analog-to-digital converter 52. This signal is digitized by the A/D converter 52 and input to a processor 54. The processor 54 performs the calculations needed to solve equation [1] and outputs a signal to an input/output interface 56. The processor may be implemented with discrete components with an FPGA (field programmable gate array), ASIC (Application Specific Integrated Circuit) or other arrangement, or in software with a general-purpose processor or a RISC (Reduced (or Rationalized) Instruction Set Computer) processor.

Figure 4:
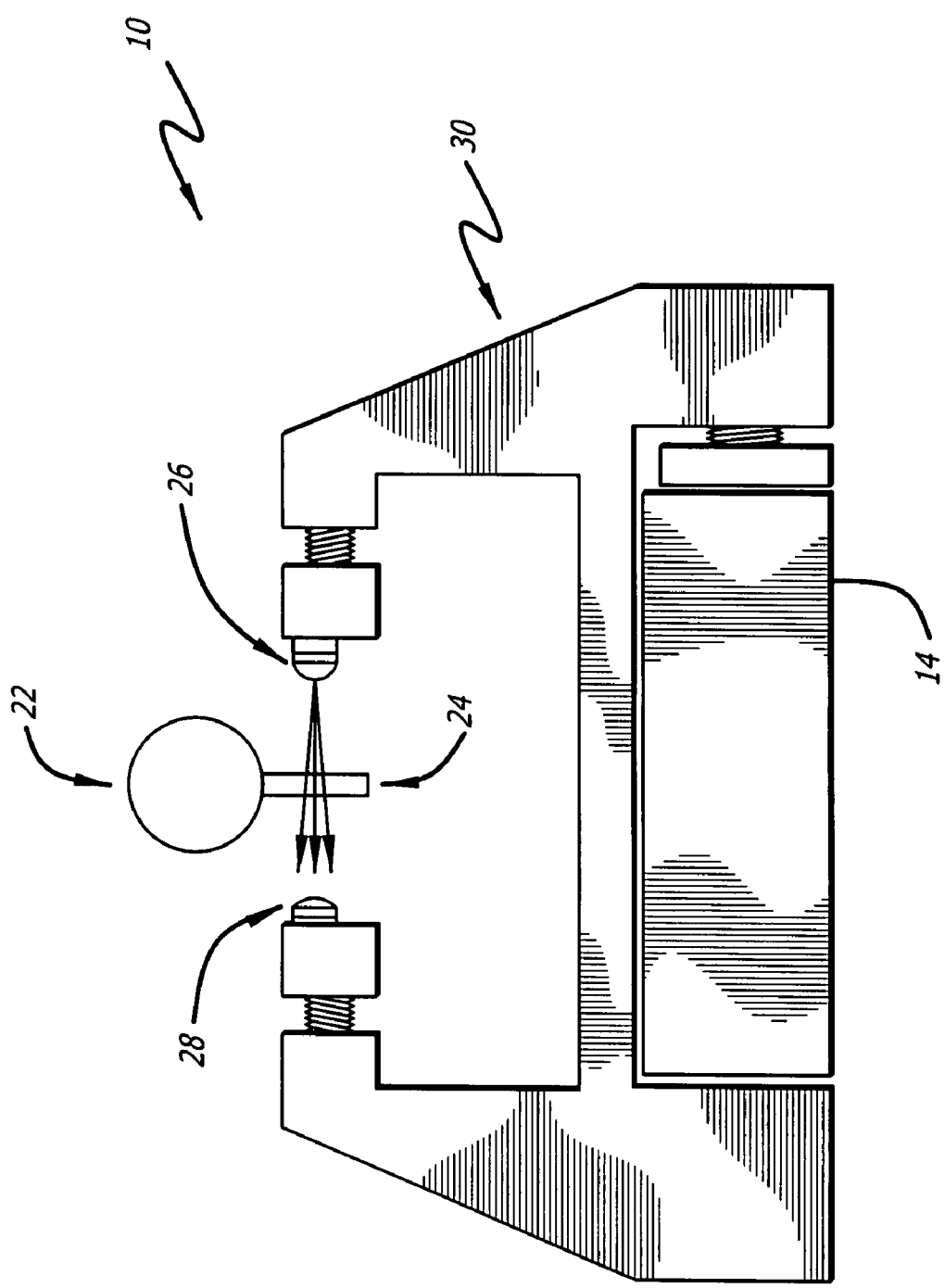
FIG. 4 is an end view of the new art cryocooler position feedback system.

FIG. 4 is an end view of the cryocooler position feedback system of FIG. 2. As depicted in FIG. 4, the LED 26 and the photodiode 28 are mounted on a support 30 such that when the shaft 22 and attached blade 24 pass a predetermined position in its waveform, a signal is output or interrupted by the photodiode 28.

Figure 5:
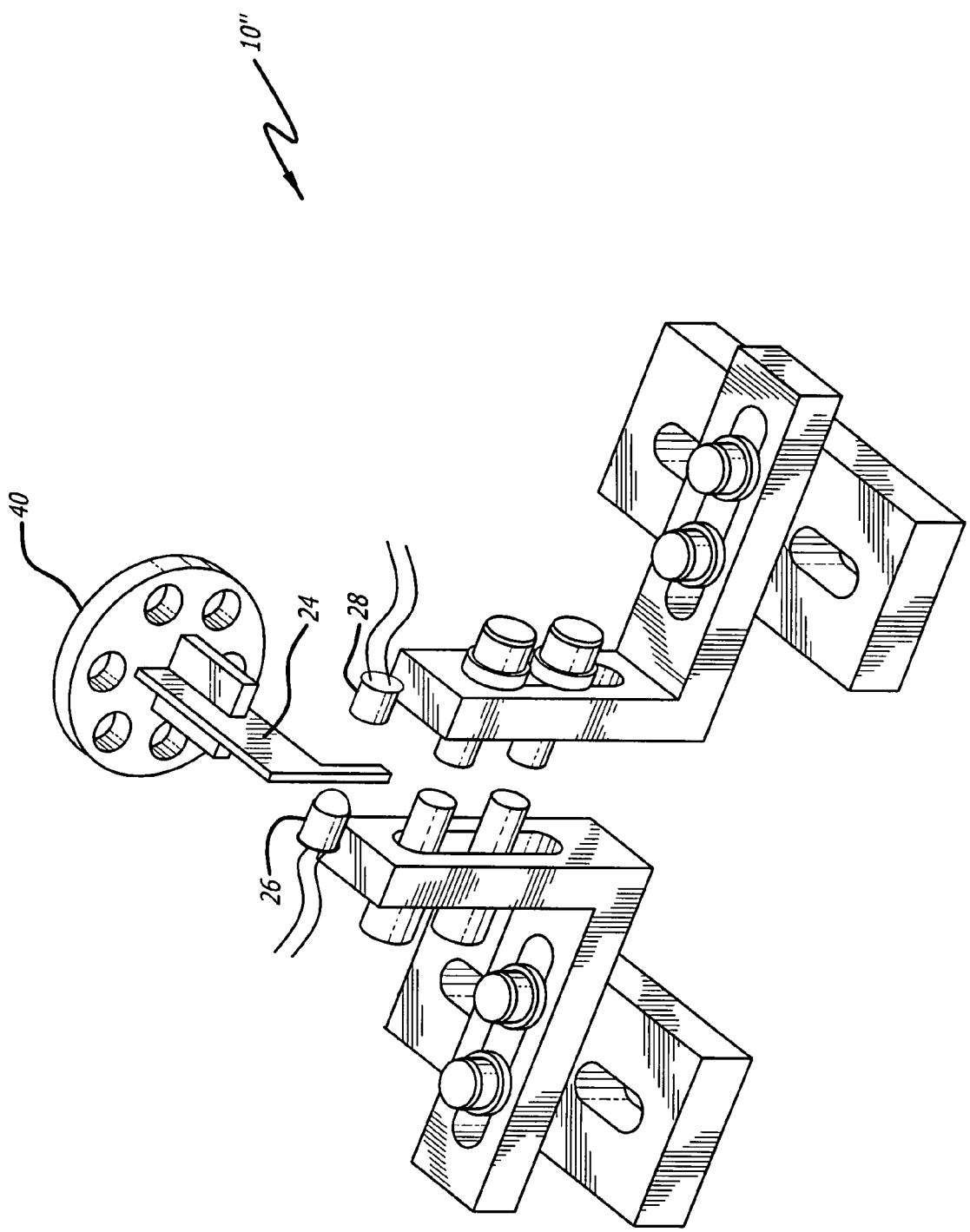
FIG. 5 is a perspective view of an arrangement for sensing a position of any element adapted for reciprocal movement in accordance with the present teachings.

FIG. 5 is a perspective view of an arrangement for sensing a position of any element adapted for reciprocal movement in accordance with the present teachings. In this case, the chopper blade 24 is mounted to the moving element (not shown) via a mounting bracket 40.

Figure 6:
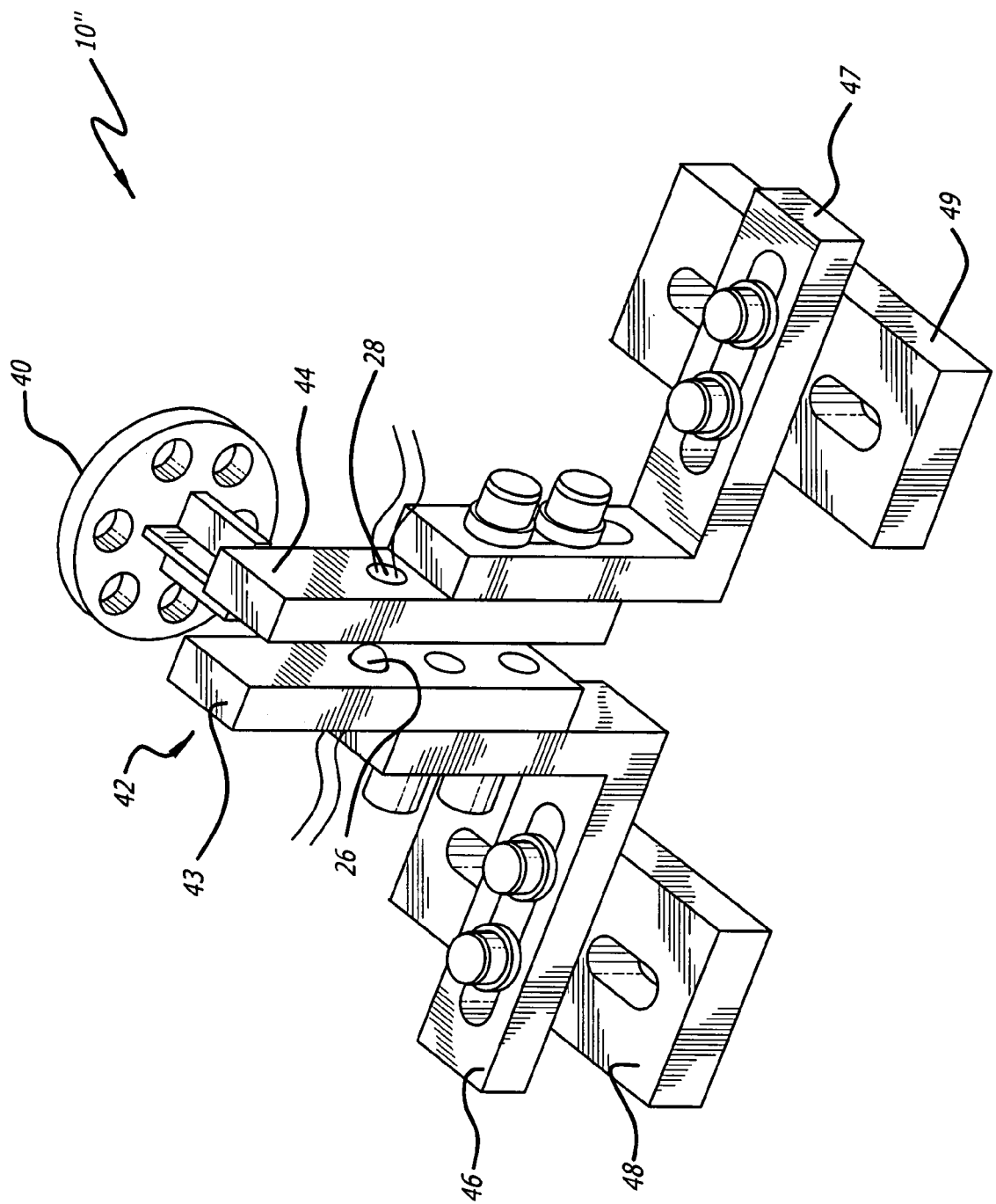
FIG. 6 shows an arrangement for supporting the LED and photodiode of FIG. 5.

FIG. 6 shows an arrangement for supporting the LED and photodiode of FIG. 5. The arrangement 42 includes first and second posts 43 and 44 with which the LED 26 and the photodiode 28 respectively are secured to a base via L brackets 46 and 47 and pedestals 48 and 49.

Figure 7:
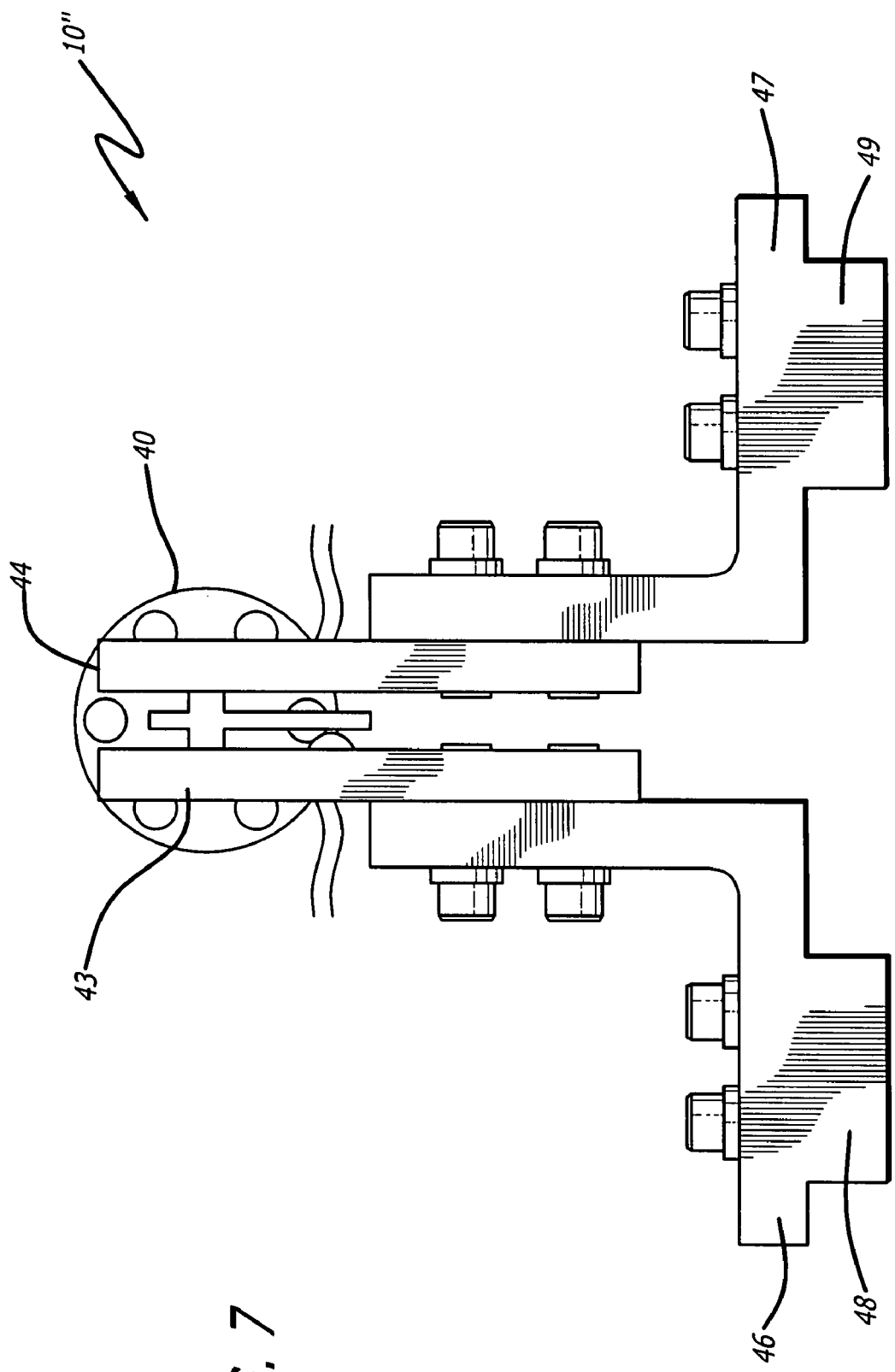
FIG. 7 is an end view of the sensing arrangement shown in FIGS. 5 and 6.

FIG. 7 is an end view of the sensing arrangement shown in FIGS. 5 and 6.

Note that, as depicted in FIG. 4, the photodiode 28 does not provide continuous feedback, but only triggers whenever the shaft 22 and attached blade 24 pass a particular pre-determined position in its waveform.

As shown in FIG. 2, every time the position waveform passes through a predetermined position (indicated on the figure with black circles) the photodiode 28 triggers. This indicates that the position waveform is now at a certain known position. Each stored trigger therefore contains two pieces of information: 1) the time of the trigger event and 2) the position of the moving element at the time of the trigger. After three trigger events are stored, all required data has been gathered and that data can then be processed to solve the equation of motion, equation [1]. The output of the algorithm will be the position waveform amplitude, DC offset, and relative phase. All relevant information about the position waveform is now known and can be used as input to relevant control loops (position control and temperature control in the case of a cryocooler system).

The cryocooler electronics need only store the time of each trigger and the predetermined position that the trigger in question corresponds to. The cryocooler electronics (not shown) are electrically coupled to the photodiode 28. The cryocooler electronics include a processor implemented in hardware or software for computing the position P(t) in accordance with equation [1].

Thus, the present invention has been described herein with reference to a particular embodiment for a particular application. Those having ordinary skill in the art and access to the present teachings will recognize additional modifications applications and embodiments within the scope thereof. The inventive system can be implemented with a variety of sensor types. For example, an optical system could be used to sample the position waveform or a simplified eddy-current or capacitive-type sensor could be employed without departing from the scope of the present teachings. Generally, however, it should be noted that the non-continuous nature of the sensors that can be used with this system (various proximity sensors, optical sensors, etc) implies that the sensors themselves can be made much smaller, simpler, and cheaper than their continuous-feedback alternatives. In any event, the number of sensors, sensor placement, number of samples, sample timing, and other related issues are expected to vary from implementation to implementation without departing from the scope of the present teachings. In addition, the invention is not limited to an arrangement by which light is blocked by the moving element. That is, other schemes may be used as well by which movement of the element either causes or terminates a reflection or transmission from a source to a sensor. And while the focus of this disclosure has been on applications to cryogenics, the present teachings are generally applicable to other resonant, oscillating systems without limitation thereto.

It is therefore intended by the appended claims to cover any and all such applications, modifications and embodiments within the scope of the present invention.

Accordingly,

What is claimed is:

1. A position sensor for a linearly oscillating moving element, the sensor comprising:

first means for non-continuously sampling a position of said linearly oscillating moving element at a plurality of positions and providing three discrete sample values in response thereto; and a processor configured to calculate a different position of said linearly oscillating moving element using said three discrete sample values of said plurality of positions.

2. The sensor of claim 1, wherein said first means comprises a photodiode.

3. The sensor of claim 2, wherein said first means comprises an LED arranged to at least intermittently illuminate the photodiode.

4. The sensor of claim 1, wherein the first means comprises a capacitive sensor.

5. The invention-sensor of claim 1 wherein the first means comprises magnetic sensor.

6. The sensor of claim 1 wherein said processor is configured to solve an equation that describes the motion of said linearly oscillating moving element.

7. The sensor of claim 6 wherein said motion is approximately sinusoidal.

8. The sensor of claim 7 wherein said equation solved by said processor is $P(t)=A\sin(\omega t+\theta)+B$, where $P(t)$=the position of the element; $A$=position waveform amplitude; $B$=position waveform DC Offset; $\omega$=angular frequency of operation; $t$=time; and $\theta$=position waveform phase.

9. An electro-mechanical method for detecting a linearly oscillating position of a linearly oscillating moving element, the method comprising:

non-continuously sampling a position of said linearly oscillating moving element at a plurality of discrete positions;

providing three discrete sample signals in response to said non-continuous sampling at said plurality of discrete positions; and using a processor to calculate and output other positions of said linearly oscillating moving element using said three discrete sample signals of said plurality of discrete positions.

10. The method of claim 9, wherein said linearly oscillating moving element comprises a component in a cryogenic cooler.

11. The method of claim 10, further comprising using the processor to solve the following equation of motion for said linearly oscillating moving element: $P(t)=A\sin(\omega t+\theta)+B$, where $P(t)$=the position of the linearly oscillating moving element; $A$=position waveform amplitude; $B$=position waveform DC Offset; $\omega$=angular frequency of operation; $t$=time; and $\theta$=position waveform phase.

* * * * *